(12) United States Patent
Wells et al.

(10) Patent No.: US 11,628,807 B2
(45) Date of Patent: Apr. 18, 2023

(54) TRACK-GUIDED WIPER SYSTEM AND METHOD

(71) Applicant: GM GLOBAL TECHNOLOGY OPERATIONS LLC, Detroit, MI (US)

(72) Inventors: James W. Wells, Rochester Hills, MI (US); Jeff E. Nasca, Bloomfield Township, MI (US); Charles W. Wampler, Birmingham, MI (US); Muhammad E. Abdallah, Rochester Hills, MI (US); Nagarajan Sivashanmugam, Troy, MI (US); Richard Nietz, Shelby Township, MI (US); Patrick Kroner, Roswell, GA (US); Bryan T. Campbell, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 689 days.

(21) Appl. No.: 16/573,447

(22) Filed: Sep. 17, 2019

(65) Prior Publication Data

US 2021/0078540 A1     Mar. 18, 2021

(51) Int. Cl.
*B60S 1/34* (2006.01)
*B60S 1/08* (2006.01)
(Continued)

(52) U.S. Cl.
CPC .............. *B60S 1/3404* (2013.01); *B60S 1/08* (2013.01); *B60S 1/20* (2013.01); *B60S 1/3402* (2013.01);
(Continued)

(58) Field of Classification Search
CPC .... B60S 1/3418; B60S 1/3404; B60S 1/3497; B60S 1/44; B60S 1/3409; B60S 1/34;
(Continued)

(56) References Cited

U.S. PATENT DOCUMENTS 1,643,919 A * 9/1927 Bornstein ................. B60S 1/18
74/37
2,845,803 A * 8/1958 Price ...................... B60S 1/3411
74/57
(Continued)

FOREIGN PATENT DOCUMENTS

DE     102004032821     *  6/2007
EP     1075990          *  2/2001
(Continued)

*Primary Examiner* — Gary K. Graham
(74) *Attorney, Agent, or Firm* — Quinn IP Law

(57) ABSTRACT

A wiper system for use with a windshield includes a track guide, a wiper assembly, a drive mechanism and a wipe mechanism. The wiper assembly has a wiper arm attached at a first end thereof to a rotor rotatably disposed on a wiper carrier, wherein the wiper carrier is engaged with the track guide and is configured for translation therealong. The drive mechanism is connected with the wiper carrier and is configured for positioning the wiper carrier along the track guide. The wipe mechanism is connected with at least one of the rotor and the wiper carrier and is configured to cause the rotor to rotate, thereby causing the wiper arm to produce a wiping motion.

6 Claims, 5 Drawing Sheets

(51) Int. Cl.
*B60S 1/20* (2006.01)
*G07C 5/08* (2006.01)

(52) U.S. Cl.
CPC ........... *B60S 1/3418* (2013.01); *B60S 1/3488* (2013.01); *B60S 1/3495* (2013.01); *G07C 5/0808* (2013.01)

(58) Field of Classification Search
CPC .. B60S 1/20; B60S 1/3495; B60S 1/08; B60S 1/06; B60S 1/3402; B60S 1/3488
USPC .............. 15/250.25, 250.21, 250.26, 250.24, 15/250.29
See application file for complete search history.

(56) References Cited

U.S. PATENT DOCUMENTS

| | | | | |
|---|---|---|---|---|
| 3,078,494 | A | * | 2/1963 | Price .......................... B60S 1/18 |
| | | | | 15/250.17 |
| 3,686,706 | A | * | 8/1972 | Finley ................... B60S 1/3404 |
| | | | | 15/250.16 |
| 3,768,112 | A | * | 10/1973 | Kolb ..................... B60S 1/3404 |
| | | | | 15/250.16 |
| 6,009,592 | A | * | 1/2000 | Habba ....................... B60S 1/26 |
| | | | | 74/31 |
| 6,163,921 | A | * | 12/2000 | Takayama ................ B60S 1/20 |
| | | | | 15/250.16 |

FOREIGN PATENT DOCUMENTS

| | | | |
|---|---|---|---|
| EP | 1457398 | * | 9/2004 |
| GB | 2173995 | * | 10/1986 |
| JP | 61-282151 | * | 12/1986 |
| WO | 2019166845 | * | 9/2019 |

* cited by examiner

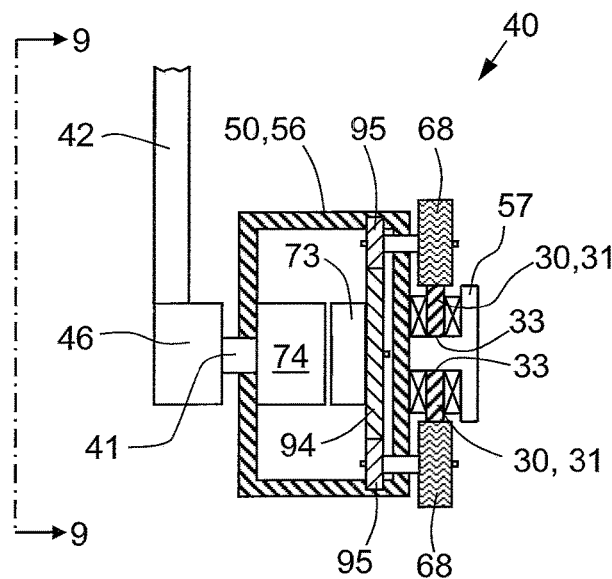
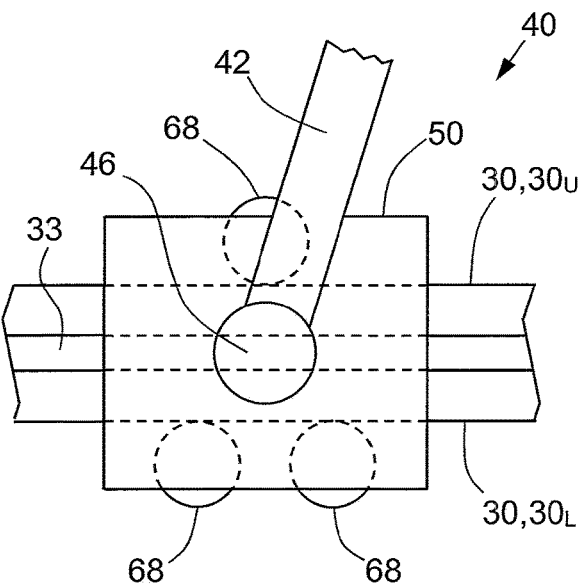
FIG. 8  FIG. 9
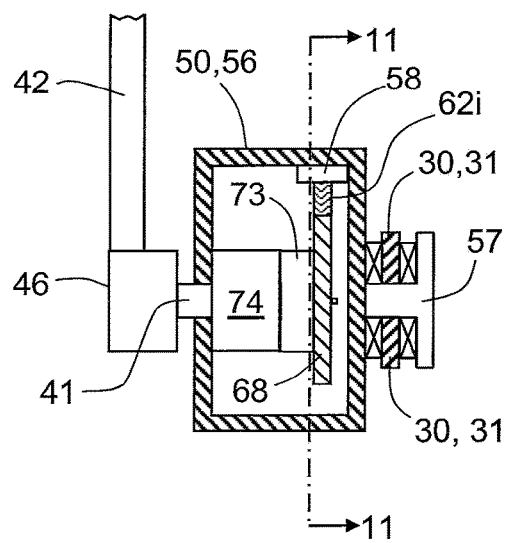
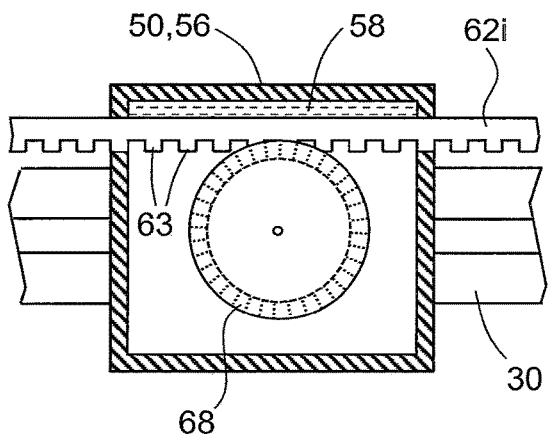
FIG. 10  FIG. 11

TRACK-GUIDED WIPER SYSTEM AND METHOD

INTRODUCTION

This disclosure relates to track-guided wiper systems and methods of controlling such systems.

Automotive vehicles typically have a glass windshield or windscreen at the front of the passenger cabin. These windshields are commonly equipped with two wiper assemblies, each fixed at a respective location near the lower edge of the windshield. Each wiper assembly includes a wiper arm carrying a wiper blade, with one end of the wiper arm being rotatably attached to an electric motor which may cause the wiper to rotate at one or more predetermined speeds, thus sweeping out an arc-like sector or area on the surface of the windshield.

The two wiper assemblies are located such that their respective arc-like swept-out sectors overlap toward the middle of the windshield. However, the locations of the wiper assemblies are fixed, making the resulting swept-out areas fixed. Thus, other areas of the windshield are never wiped by the wipers.

SUMMARY

A wiper system includes a track guide, a wiper assembly, a drive mechanism and a wipe mechanism. The wiper assembly has a wiper arm attached at a first end thereof to a rotor rotatably disposed on a wiper carrier, wherein the wiper carrier is engaged with the track guide and is configured for translation therealong. The drive mechanism is connected with the wiper carrier and is configured for positioning the wiper carrier along the track guide. The wipe mechanism is connected with at least one of the rotor and the wiper carrier and is configured to cause the rotor to rotate.

The wipe mechanism may include an electric motor carried onboard the wiper carrier. The drive mechanism may include an electric motor carried onboard the wiper carrier and a tractive element connected with the electric motor, wherein the tractive element is configured to engage at least one of the track guide and an incremented linear element extending along a length of the track guide. The drive mechanism may include a forcer portion of a linear electric motor carried onboard the wiper carrier, and a stator portion of the linear electric motor carried on the track guide and extending along a length thereof.

The drive mechanism may include a first electric motor located offboard the wiper carrier and a first linear element attached at a first end thereof to the wiper carrier and at a second end thereof to the first electric motor, wherein the first electric motor and first linear element may be configured for at least one of pushing and pulling the wiper carrier along the track guide. The drive mechanism may further include a second motive element located offboard the wiper carrier and a second linear element attached at a third end thereof to the wiper carrier and at a fourth end thereof to the second motive element, wherein the first electric motor, the second motive element and the first and second linear elements are cooperatively configured for positioning the wiper carrier along the track guide.

The drive mechanism may include a first electric motor located offboard the wiper carrier, a first redirecting element located at a first end of the track guide, a second redirecting element located at a second end of the track guide, and a first linear element wrapped around each of the first and second redirecting elements and having first and second ends each attached to the wiper carrier, wherein the first electric motor is configured to engage at least one of the first redirecting element, the second redirecting element and the first linear element for positioning the wiper carrier along the track guide.

The wipe mechanism may include a third electric motor located offboard the wiper carrier and a third linear element attached at a fifth end thereof to at least one of the rotor and the wiper carrier and at a sixth end thereof to the third electric motor, wherein the third electric motor and third linear element are configured to cause the rotor to rotate. The wipe mechanism may further include a fourth motive element located offboard the wiper carrier and a fourth linear element attached at a seventh end thereof to the at least one of the rotor and the wiper carrier and at an eighth end thereof to the fourth motive element, wherein the third electric motor, the fourth motive element and the third and fourth linear elements are cooperatively configured for causing the rotor to rotate.

At least one of a power signal and a control signal may be carried to at least one of the drive mechanism and the wipe mechanism onboard the wiper carrier, via at least one of one or more electrically conductive lines on the track guide and a first linear element attached at a first end thereof to the wiper carrier and at a second end thereof to a first motive element located offboard the wiper carrier.

A wiper assembly for use with a track guide may include a wiper carrier configured for engagement with and translation along the track guide, and a wiper arm attached at a first end thereof to a rotor rotatably disposed on the wiper carrier. The wiper assembly may further include at least one electric motor carried onboard the wiper carrier and configured for at least one of positioning the wiper carrier along the track guide and causing the rotor to rotate. The at least one electric motor may be configured to receive at least one of a power signal and a control signal via at least one of: one or more electrically conductive lines on the track guide, and a first linear element attached at a first end thereof to the wiper carrier. The wiper assembly may further include at least one connection point on the wiper carrier, each of the at least one connection point configured for at least one of: connection with a first linear element driven by a first electric motor located offboard the wiper carrier for positioning the wiper carrier along the track guide; and connection with a third linear element driven by a third electric motor located offboard the wiper carrier for causing the rotor to rotate. The wiper assembly may further include at least one onboard electric motor carried onboard the wiper carrier and configured for at least one of: positioning the wiper carrier along the track guide, and causing the rotor to rotate.

A method of controlling a wiper system having at least one wiper assembly configured for movement along a track guide includes: (i) receiving inputs from at least one of a driver control, a sensor and a computer element; (ii) determining a wipe sequence based on the received inputs; (iii) executing a next step in the determined wipe sequence; (iv) detecting whether an execution error occurred in the executed next step; (v) if an execution error is detected, then performing a diagnostic sequence, else returning to the receiving step; (vi) observing whether a diagnostic error occurred in the performed diagnostic sequence; and (vii) if a diagnostic error is observed, then registering a diagnostic fail state and reverting to the receiving step, else reverting to the receiving step. The computer element may be configured to store information relating to at least one of a driver action, a vehicle operating parameter, an external environment, a diagnostic state of the wiper system, a diagnostic history of the wiper system and an execution status of the determined wipe sequence. The diagnostic sequence may be associated with the wipe sequence, and the determining step may include selecting the wipe sequence from a group of predetermined wipe sequences. The wiper system may include at least two wiper assemblies, and the group of predetermined wipe sequences may include at least one of: a wipe sequence for alternating wipes between the two wiper assemblies; and a wipe sequence for use of only one of the wiper assemblies in an event of failure of the other of the wiper assemblies.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 8 is a schematic partial cross-sectional view of an alternative version of the track guide and wiper assembly as viewed along line 6-6 of FIG. 1.

FIG. 9 is a schematic front view of the alternative version of the track guide and wiper assembly along line 9-9 of FIG. 8.

FIG. 10 is a schematic partial cross-sectional view of another alternative version of the track guide and wiper assembly as viewed along line 6-6 of FIG. 1.

FIG. 11 is a schematic front view of the alternative version of the track guide and wiper assembly along line 11-11 of FIG. 10.

DETAILED DESCRIPTION

Figure 1:
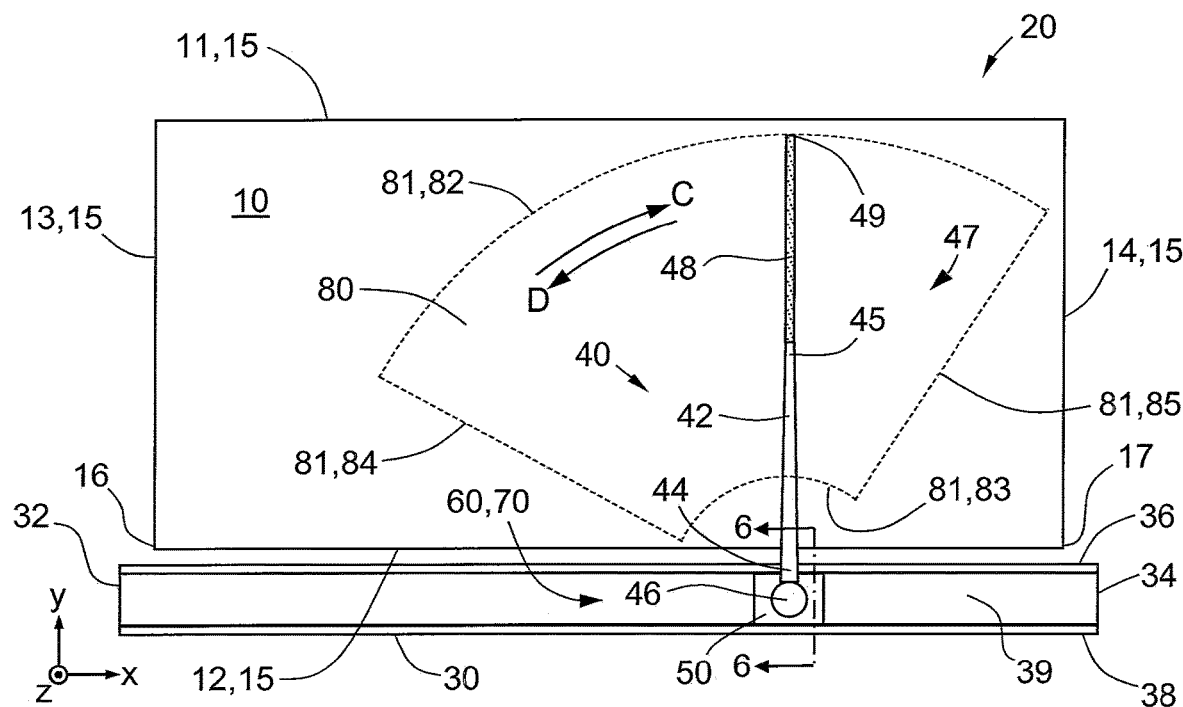
FIG. 1 is a schematic front view of a first embodiment of a wiper system.

Referring now to the drawings, wherein like numerals indicate like parts in the several views, a wiper system 20, a wiper assembly 40 for use in the wiper system 20, and a method 100 of controlling the wiper system 20 are shown and described herein. Unlike conventional wiper systems having wipers that rotate about respective fixed points, the wiper system 20 disclosed herein has one or more "mobile" wiper assemblies 40 which may translate along a path and rotate at multiple points along the path. This approach enables additional wiping schemes and control methods 100 not available with conventional fixed wiper systems.

FIG. 1 shows a schematic front view of a first embodiment of a wiper system 20 according to the present disclosure. The system 20 includes a track guide 30, a wiper assembly 40, a drive mechanism 60 and a wipe mechanism 70. The track guide 30 may be an extrusion or other fabrication having a cross-sectional shape/profile 31, as shown in the schematic cross-sectional views of FIGS. 6, 8 and 10 (taken along line 6-6 of FIG. 1), which is generally continuous along the length of the track guide 30. The track guide 30 may be located along an edge of a windshield 10 or other transparent window, such as along the bottom edge 12 of the windshield 10 shown in FIG. 1. The track guide 30 may alternatively or additionally extend along one or more other edges 11/13/14 of the windshield 10 as well; i.e., it may extend anywhere along the perimeter 15 of the windshield 10.

In the lower-left corner of FIG. 1, an x-y-z coordinate system is defined with respect to the generally rectangular windshield 10. Thus, the positive y-direction may be seen as pointing "upward" toward an "upper" edge 11 of the windshield, while the negative y-direction points "downward" toward a "lower" edge 12. Likewise, the positive and negative x-directions appear to point "rightward" and "leftward", respectively, toward respective "right" and "left" edges 14/13 of the windshield 10. This same directional convention is referred to herein with respect to other drawings as well. However, note that this is an arbitrary convention presented merely for the sake of illustration and reference. Likewise, while a rectangular windshield 10 is shown schematically in the drawings, the present disclosure applies to other shapes as well, such as trapezoidal (e.g., wider along the lower edge 12 and narrower along the upper edge 11), circular, etc., and includes windshields which curve "outward" or "inward" in the positive or negative z-directions, respectively, as well as in the x- and/or y-directions (i.e., the windshield 10 may have compound curvature).

Figure 6:
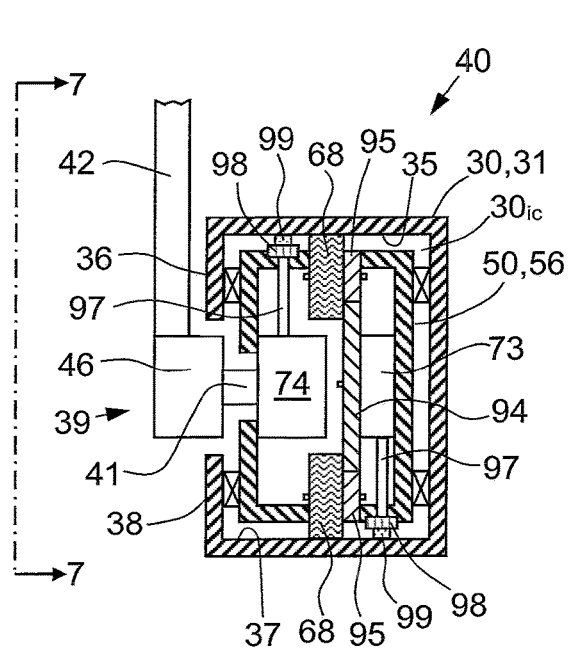
FIG. 6 is a schematic partial cross-sectional view of the track guide and wiper assembly as viewed along line 6-6 of FIG. 1.
Figure 7:
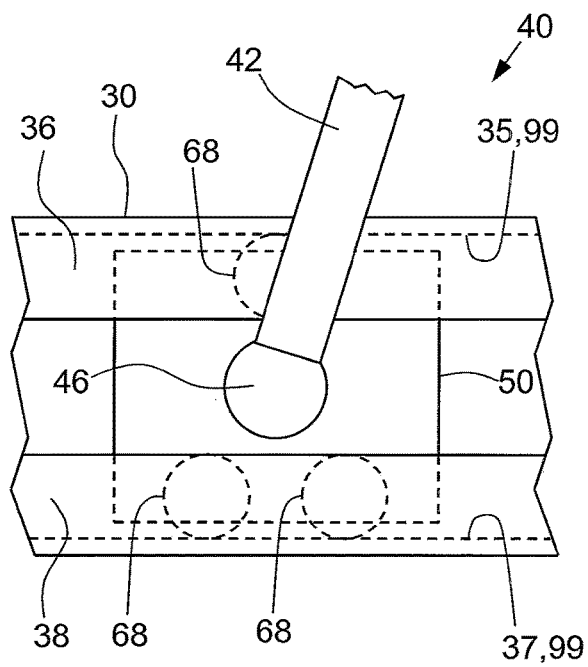
FIG. 7 is a schematic front view of the track guide and wiper assembly along line 7-7 of FIG. 6.

The wiper assembly 40 includes a wiper carrier 50, which may have a box-like shape or other suitable configuration or shape. For example, the wiper carrier 50 may include a generally rectangular or box-like housing or enclosure 56. The track guide 30 and the wiper carrier 50 may be sized, shaped and configured such that the wiper carrier 50 may be slidably engaged on or within the track guide 30 for translation therealong. For example, as illustrated in FIGS. 6-7, the track guide 30 may have an upper rail 36 and a lower rail 38 which (along with the rest of the track guide 30) act to generally contain or constrain the wiper carrier 50 (along with optional bearings, rollers, etc.) inside the interior channel $30_{ic}$ of the track guide 30. In other words, in this configuration the wiper carrier 50 is slidably disposed generally "within" or "inside" the interior channel $30_{ic}$ of the track guide 30, and one or more tractive elements 68 (e.g., rubber wheels) may make contact with upper and lower interior surfaces 35/37 of the track guide 30. And in an alternative configuration shown in FIGS. 8-9, the track guide 30 may have the form of a simple rail, with the wiper carrier 50 being slidably disposed "on" the track guide 30, with the tractive elements 68 making contact with upper and lower exterior surfaces $30_U/30_L$ of the track guide 30. In this configuration, an optional slot 33 may run along the length of the track guide 30, and the wiper carrier 50 may have a follower 57 or other member engaged with the slot 33.

Figure 2:
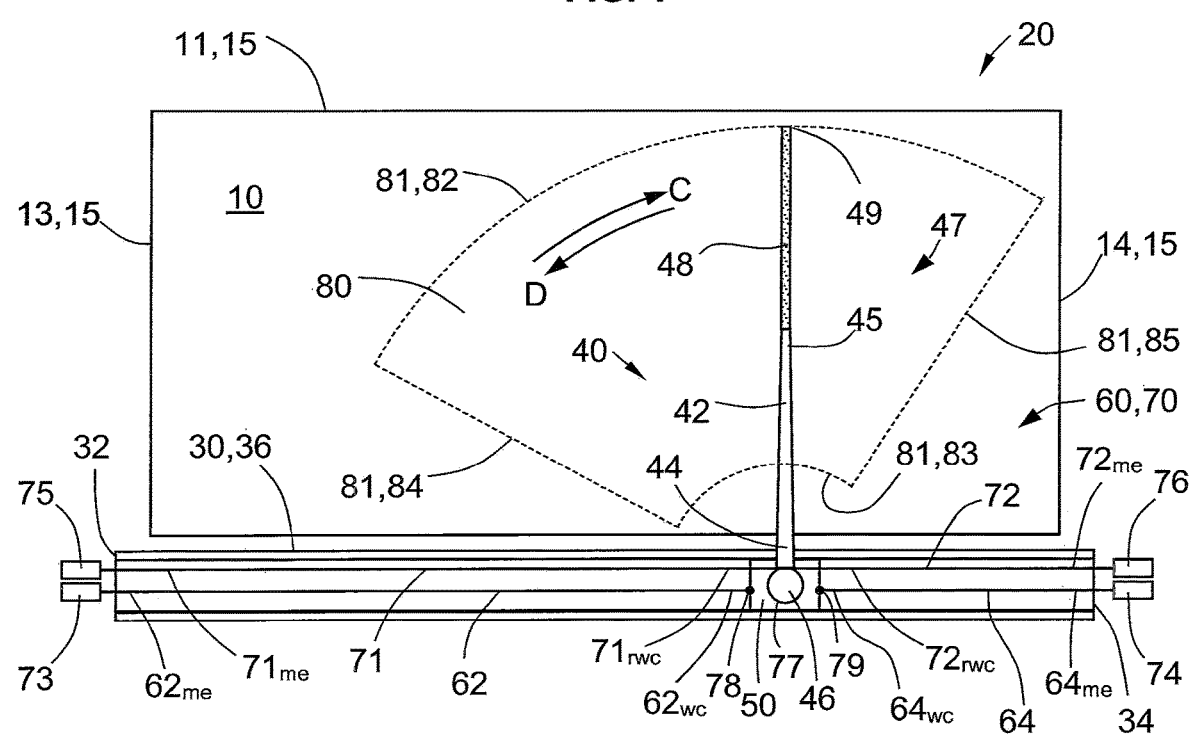
FIG. 2 is a schematic front view of a second embodiment of a wiper system.

The wiper assembly 40 also includes a wiper arm 42 attached at a first end 44 thereof to a rotor 46 that is rotatably disposed on the wiper carrier 50. The wiper arm 42 may include a wiper blade 48 made of an elastomeric or other material, which may be attached to a second end 45 of the wiper arm 42 opposite the first end 44. As the rotor 46 is rotated about its axis in the clockwise and counter-clockwise directions C/D, the wiper arm/wiper blade 42/48 (collectively referred to as the "wiper" 47) is swept in an arc, and an arcuate sector-like area 80 is swept/wiped by the wiper blade 48, as illustrated in FIGS. 1-2. The upper tip 49 of the wiper 47 defines an outer arcuate edge 82 of the perimeter 81 of the swept area 80, while an inner tip (not shown) defines an inner arcuate edge 83. The perimeter 81 of the sector-like swept area 80 also includes a first or left linear edge 84 and a second or right linear edge 85.

The wiper assembly 20 further includes the drive mechanism 60 and the wipe mechanism 70, and each of these mechanisms 60/70 may be presented in various configurations. The drive mechanism 60 is connected with the wiper carrier 50 and is configured for positioning the wiper carrier 50 along the track guide 30 between the left and right edges 32/34 of the track guide 30. The wipe mechanism 70 is connected with the rotor 46, the wiper carrier 50, or both 46/50, and is configured to cause the rotor 46 to rotate so that rotational wiping by the wiper 47 can be effected in the clockwise and/or counter-clockwise directions C/D. Thus, the drive mechanism 60 is responsible for driving the wiper assembly 40 back and forth along the track guide 30, while the wipe mechanism 70 is responsible for causing the wiper 47 to rotate.

Figure 3:
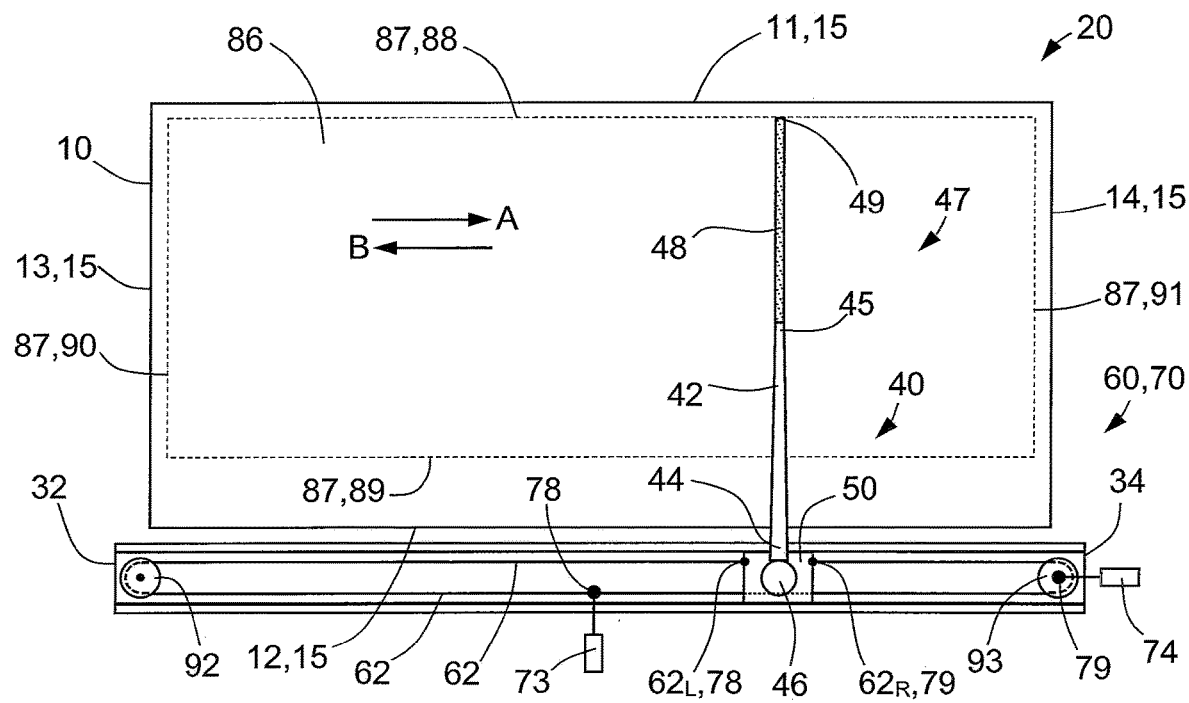
FIG. 3 is a schematic front view of a third embodiment of a wiper system.

It should be noted that while the wiper system 20 may wipe or sweep out an arcuate or sector-like area 80 as illustrated in FIGS. 1-2, the system 20 may also sweep out a rectangular area 86 as illustrated in FIG. 3. The swept-out rectangular area 86 has a perimeter 87 which includes an outer or top linear edge 88, an inner or bottom linear edge 89, a left linear edge 90 and a right linear edge 91. The arcuate/sector-like area 80 may be swept out when the wiper assembly 40 is positioned at a given location along the track guide 30 and the wiper 47 is rotated. On the other hand, a rectangular area 86 may be swept out when the wiper 47 is oriented in a generally "vertical" or "12 o'clock" orientation (i.e., pointed in the positive y-direction), and the wiper assembly 40 is moved along the track guide 30 in the leftward and/or rightward directions A/B while the "12 o'clock" orientation is maintained (i.e., no rotation occurs). This lateral or translational movement of the wiper assembly 40 in the leftward/rightward directions A/B may be accomplished by driving the wiper carrier 50 along the track guide 30 via the drive mechanism 60. The rotational and translational motions of the wiper assembly 40 can be coordinated to wipe other shapes as well. For example, if the windshield 10 is trapezoidal in shape (i.e., narrower along the top edge 11 than along the bottom edge 12), the rotation of the wiper 47 may be coordinated with the translation of the wiper carrier 50 so that the left and right edges of the swept-out area extends to the left and right edges of the windshield 10. (In other words, the swept-out area 80/86/etc. may match the shape and size of the windshield 10, and the desired shape and size of the swept-out area 80/86/etc. may be achieved by coordinating the rotation and translation.)

Each of the drive and wipe mechanisms 60/70 may include one or more components that are "onboard" or "offboard" the wiper carrier 50; that is, an0 "onboard" component may be located/carried on or within the wiper carrier/housing 50/56, while an "offboard" component may be located somewhere other than on or within the wiper carrier/housing 50/56. In some configurations, the entire drive or wipe mechanism 60/70 may be carried onboard the wiper carrier 50, while in other configurations one part of the drive or wipe mechanism 60/70 may be carried onboard and another part of the drive or wipe mechanism 60/70 may be disposed offboard. Each of the drive and wipe mechanisms 60/70 may include a motive element. As used herein, a "motive element" means an element capable of imparting motive effort on another object, so as to urge or cause that object to move. Motive elements may be divided into two types: active and reactive. An "active" motive element operates to urge or cause movement of an object independent of whether the object is imparting any force on (or offering any resistance against) the motive element, and examples include electric motors. In contrast, a "reactive" motive element operates to urge or cause movement of an object by reacting to a force imparted by the object on the motive element, and examples include springs, spring-loaded mechanisms and other mechanisms which store potential energy.

For example, in a first embodiment illustrated in FIG. 1, both the drive mechanism 60 and the wipe mechanism 70 may be onboard the wiper carrier 50. This first embodiment may be further understood in connection with the configuration shown in FIGS. 6-7 (in which the wiper carrier 50 is disposed "within" the interior channel $30_{ic}$ of the track guide 30), as well as the alternative configuration shown in FIGS. 8-9 (in which the wiper carrier 50 is disposed "on" the track guide 30). In this first embodiment, each of the drive and wipe mechanisms 60/70 may comprise an active motive element 73 (such as an electric motor) carried onboard the wiper carrier 50. This first embodiment may include a separate motive element for each of the drive and wipe mechanisms 60/70 (e.g., two electric motors 73/74), or a single motive element that serves both mechanisms 60/70 (e.g., one electric motor 73, which may include a transmission, clutch or latching mechanism to selectably enable use of the motor 73 for translating, rotating or both).

The drive mechanism 60 may include an electric motor 73 carried onboard the wiper carrier 50 and a tractive element 68 connected with the electric motor 73, wherein the tractive element 68 is configured to engage the track guide 30, an incremented linear element 62$i$ extending along a length of the track guide 30, or both. For example, the tractive element 68 may be a wheel or hub attached to the end of the electric motor's rotor shaft and having an outer circumference made of friction material (e.g., rubber), with the wheel's outer circumference disposed in contact with a surface of the track guide 30 that runs along the length of the track guide 30. (This surface may be an interior surface 35/37 of track guide 30 when the wiper carrier 50 is disposed within the track guide 30, as shown in FIGS. 6-7, or an exterior surface $30_U/30_L$, as shown in FIGS. 8-9.) In this arrangement, when the electric motor's rotor shaft is activated in a first rotational direction, it rotates an attached gear 94 in that same direction. This gear 94 is dentally engaged with one or more other gears 95 that are each connected with a respective tractive element 68, and these gears 95 and tractive elements 68 rotate in a second rotational direction opposite the first rotational direction. This drives the tractive elements/friction wheels 68 against the track guide surface(s), thus driving the wiper carrier 50 and wiper assembly 40 along the track guide 30.

Figure 5:
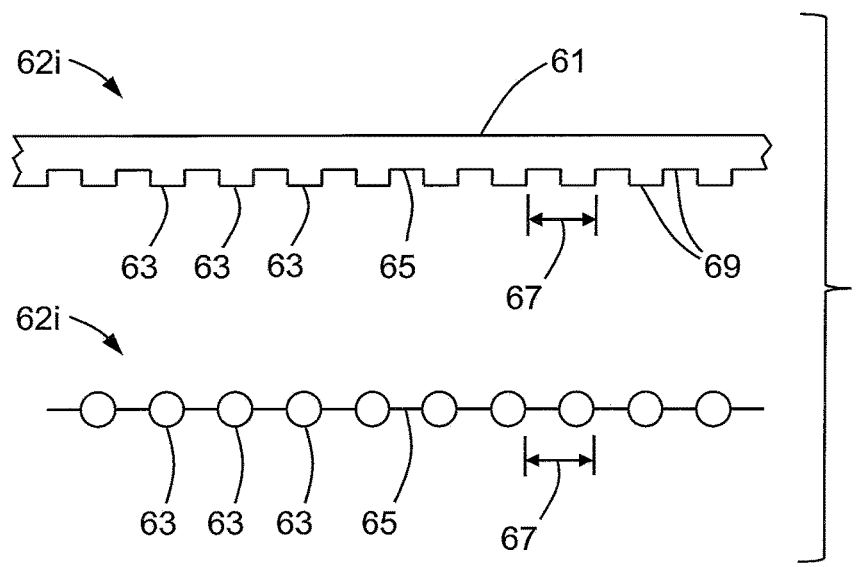
FIG. 5 is a schematic top view of exemplary linear elements which may be used with a wiper system.

Alternatively, the tractive element 68 may be a mechanism (located on or inside the wiper carrier/housing 50/56) that is connected with the electric motor 73 and is configured to engage with an incremented linear element 62$i$ that extends along all or a part of the track guide's length. As illustrated in FIG. 5, the incremented linear element 62$i$ may be a chain, belt, tether or other elongated structure having graspable elements 63 disposed at regular intervals or increments 67 thereon. For example, the incremented linear element 62$i$ may take the form of an elastomeric belt having teeth 63 formed on a toothed side 69 of the belt 62$i$ and a smooth surface 61 on the opposing side. These teeth 63 may extend outward from the belt 62i on the toothed side 69, thereby defining a root or bottom land 65 between each pair of adjacent teeth 63. The teeth 63 and roots/bottom lands 65 may be consistently and repeatedly shaped and spaced along the length of the belt 62i such that the teeth 63 are presented at regular, repeating intervals 67 along the belt's length. Or, the incremented linear element 62i may take the form of a chain having balls 63 connected together in series by short straight segments 65 between each pair of adjacent balls 63, with the size, shape and spacing of the balls 63 being such that they are presented at regular intervals 67 along the length of the chain 62i. Alternatively, the incremented linear element 62i may take the form of a chain (not shown) having links of consistent size, or a string or tether (not shown) having knots of a consistent size disposed regularly along the string's length. In whatever form the incremented linear element 62i may take, it may either be affixed directly to the track guide 30 along some or all of the track guide's length, or otherwise affixed adjacent/alongside (but not directly onto) the track guide 30, and positioned such that the teeth, balls, links, knots, etc. 63 may serve as graspable elements which the tractive element 68 may engage, grasp or grab onto. As illustrated in FIGS. 10-11, the tractive element 68 may include a gear, sprocket or other mechanism which engages with or grasps/grabs onto the individual graspable elements 63 as the tractive element 68 is rotated by the electric motor 73. The wiper carrier 50 may include one or more rollers or guide elements 58 for constraining and/or guiding the incremented linear element 62i through or along the wiper carrier 50. Thus, the electric motor's rotation may be controlled so as to cause the tractive element 68 to rotate at a selected rotational speed and in a desired rotational direction, thereby causing the wiper carrier 50 and wiper assembly 40 to be driven along the incremented linear element 62i (and thus along the length of the track guide 30) at a desired linear speed and direction.

Figure 4:
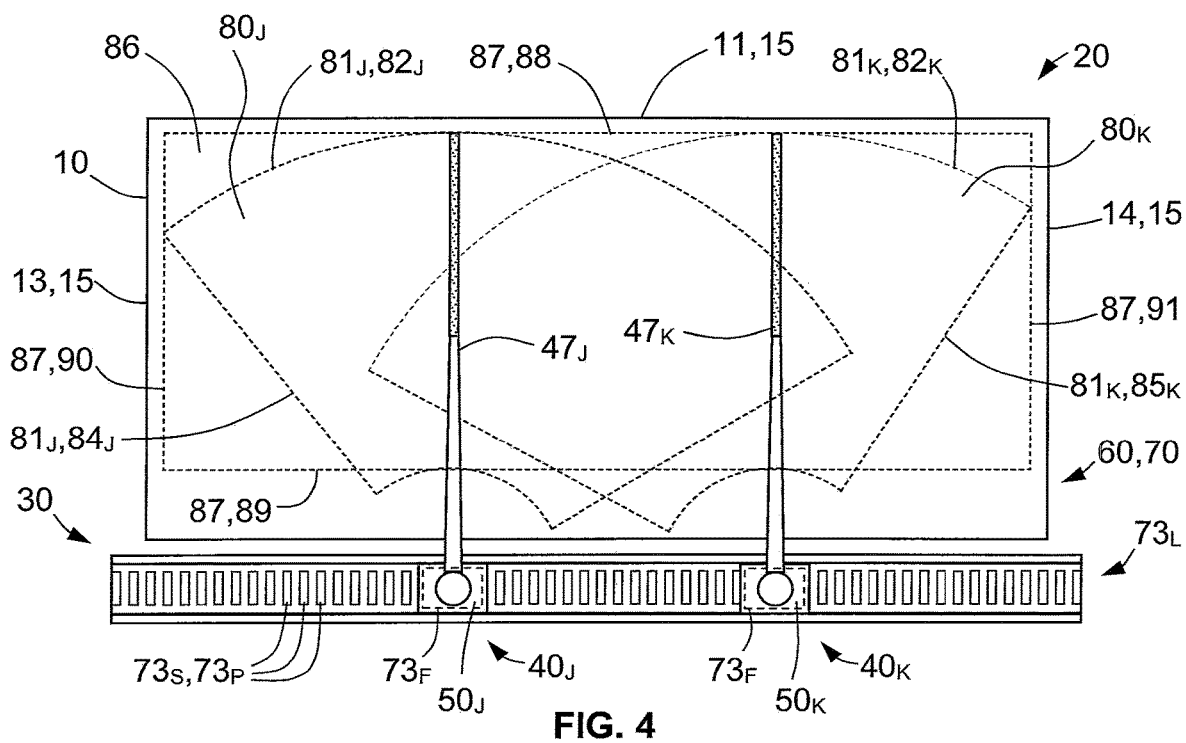
FIG. 4 is a schematic front view of a fourth embodiment of a wiper system illustrating wiper rotations and translations from multiple points along the track guide.

Optionally, the drive mechanism 60 may be configured as a linear electric motor $73_L$ as illustrated in FIG. 4, in which a forcer portion $73_F$ thereof (shown in dashed lines) is carried onboard the wiper carrier 50, and a stator portion $73_S$ thereof is carried on the track guide 30 and extends along a length of the track guide 30. In this arrangement, the stator portion $73_S$ may include a series of permanent magnets $73_P$ disposed along the track guide 30, while the forcer portion $73_F$ may include an electromagnetic coil which can be activated to drive the wiper carrier 50 at desired speeds and to desired locations along the track guide 30.

The wipe mechanism 70 may include an electric motor 74 whose rotor shaft is attached to a rotor stem 41 extending through an opening 39 in the track guide 30. This rotor stem 41 is in turn attached to the rotor 46, which is attached to the wiper arm 42. Thus, when the electric motor 74 is actuated, the wiper arm 42 and wiper 47 are rotated about the axis of the rotor 46, thereby sweeping out and wiping an arc-like sector or area 80 on the windshield 10.

FIG. 2 shows a schematic front view of a second embodiment of a wiper system 20 according to the present disclosure. Here, the drive mechanism 60 may include a first motive element/electric motor 73 located offboard the wiper carrier 50 and a first linear element 62 attached at a first end $62_{wc}$ thereof to the wiper carrier 50, and attached at a second end $62_{me}$ thereof to the first motive element/electric motor 73. The linear element 62 may be a cable, chain, belt, tether or other elongated structure similar to the incremented linear element 62i, but not necessarily having graspable elements 63 disposed at regular intervals or increments 67 thereon. In this offboard configuration, the first electric motor 73 and the first linear element 62 may be configured for pushing and/or pulling the wiper carrier 50 along the track guide 30. For example, if the first linear element 62 is an ordinary cable, chain, belt or tether, it may be used to pull the wiper carrier 50; but, if the first linear element 62 is a push-pull chain (also called a linear motion chain), it may be used for both pushing and pulling the wiper carrier 50.

The drive mechanism 60 may further include a second motive element 74 located offboard the wiper carrier 50 and a second linear element 64 attached at a third end $64_{wc}$ thereof to the wiper carrier 50 and at a fourth end $64_{me}$ thereof to the second motive element 74. In this arrangement, the first electric motor 73, the second motive element 74 and the first and second linear elements 62/64 are cooperatively configured for positioning (e.g., pushing/pulling) the wiper carrier 50 along the track guide 30. Note that in arrangements having a first motive element 73 but not a second motive element 74, the first motive element 73 may be an active element, such as an electric motor, which provides both the pushing and pulling action for moving and positioning the wiper carrier 50. In such an arrangement, the first linear element 62 may be configured to transfer both the pushing motion and the pulling motion imparted by the first motive element 73. However, in arrangements having both first and second motive elements 73/74, either or both may be active elements such as electric motors, and the first and second linear elements 62/64 may be configured to transfer either pulling motion, or pushing motion, or both, depending on the arrangement of the first and second motive elements 73/74.

In the second embodiment shown in FIG. 2, the wipe mechanism 70 may include a third motive element/electric motor 75 located offboard the wiper carrier 50 and a third linear element 71 attached at a fifth end $71_{rwc}$ thereof to the rotor 46 and/or the wiper carrier 50 and at a sixth end $71_{me}$ thereof to the third electric motor 75. In this arrangement, the third electric motor 75 and third linear element 71 are configured to cause the rotor 46 to rotate. For example, the third electric motor 75 may act to both push/let out and pull the third linear element 71, and the third linear element 71 may be connected to the rotor 46 at its fifth end $71_{rwc}$ (such as having a loop 77 of third linear element material wrapped around and connected to the rotor 46). If the third linear element 71 is a cable, chain or other non-rigid structure capable of being pulled by the third electric motor 75 but not pushed, then the rotor 46 and/or wiper carrier 50 may include a torsional return spring or other mechanism onboard which imparts tension through the rotor 46 to the third linear element 71. However, if the third linear element 71 is a structure capable of being both pushed and pulled (like a linear motion chain), then no return spring or other mechanism onboard may be needed.

Note that while the third linear element 71 may be connected at its fifth end $71_{rwc}$ to the rotor 46, it may also be connected to the wiper carrier 50, or more specifically, to one or more elements within or onboard the wiper carrier 50, such as an internal mechanism (e.g., a rack-and-pinion gear set) which transforms the pushing/pulling action of the third linear element 71 into rotation of the rotor 46. The wipe mechanism 70 may further include a fourth motive element 76 located offboard the wiper carrier 50 and a fourth linear element 72 attached at a seventh end $72_{rwc}$ thereof to the rotor 46 and/or the wiper carrier 50, and at an eighth end $72_{me}$ thereof to the fourth motive element 76. In this arrangement, the third electric motor 75, the fourth motive element 76 and the third and fourth linear elements 71/72 are cooperatively configured for causing the rotor 46 to rotate.

Optionally, the third and fourth linear elements 71/72 may be one continuous or contiguous element (e.g., a single cable); in this arrangement, the element 71/72 may be wrapped around the rotor 46 so as to form one or more loops 77 about the rotor 46, and the loop(s) may optionally be fastened to the rotor 46 as well. For example, the third motive element 75 may pull on the third linear element 71 to the left, which causes the rotor 46 (and wiper 47) to rotate in a counter-clockwise direction D. During this counter-clockwise wiper motion, the fourth motive element 76 lets out or moves the fourth linear element 72 to the left at the same speed in which the third linear element 71 is moving. At the desired end of the counter-clockwise motion, the third motive element 75 is commanded to stop pulling the third linear element 71 leftward, and the fourth motive element 76 is commanded to pull the fourth linear element 72 to the right, which causes the rotor 46 and wiper 47 to rotate in a clockwise direction C. During this clockwise wiper motion, the third motive element 75 lets out or moves the third linear element 71 to the right at the same speed in which the fourth linear element 72 is moving. These cycles may be repeated in order to cycle the wiper 47 back-and-forth through successive rotational wipes.

Note that when the drive mechanism 60 (e.g., the first and second motive elements 73/74 and the first and second linear elements 62/64) moves the wiper carrier 50 along the track guide 30, the wipe mechanism 70 may cause the third and fourth motive elements 75/76 to let out or move the third and fourth linear elements 71/72 at the same speed and direction in which the wiper carrier 50 is moving, so as to prevent any rotation of the rotor 46 and wiper 47 during the movement. Note that each motive element 73/74/75/76 may include a way of gathering up "slack" in the linear elements 62/64/71/72 as needed, and letting out the linear elements 62/64/71/72 as needed, such as by using spring-loaded take-up reels or the like.

FIG. 3 shows a schematic front view of a third embodiment of a wiper system 20 according to the present disclosure. In this embodiment, the drive mechanism 60 may include a first motive element/electric motor 73 located offboard the wiper carrier 50, a first redirecting element 92 located at a first end 32 of the track guide 30, a second redirecting element 93 located at a second end 34 of the track guide 30, and a first linear element 62 wrapped around each of the first and second redirecting elements 92/93, with first and second ends $62_L/62_R$ of the first linear element 62 attached to the wiper carrier 50. The redirecting elements 92/93 may be pulleys, capstans, through-holes (e.g., formed in the track guide 30), or any other suitable structure for redirecting the direction that the first linear element 62 is running in. In this arrangement, the first electric motor 73 is configured to engage one or more of the first redirecting element 92, the second redirecting element 93 and the first linear element 62, for positioning the wiper carrier 50 along the track guide 30. For example, FIG. 3 illustrates an arrangement where a first electric motor 73 is engaged with the first linear element 62 at a first engagement point 78, which may include a mechanism connected with the electric motor 73 for driving the first linear element 62 leftward and rightward, which in turn drives the first linear element 62 clockwise and counter-clockwise, respectively, around the redirecting elements 92/93, and which causes the wiper carrier 50 to move rightward and leftward, respectively, along the track guide 30. Alternatively or in addition to the first electric motor 73 being engaged with the first linear element 62, a second motive element/electric motor 74 is shown operatively connected at a second engagement point 79 with the second redirecting element 93. The second engagement point 79 may include a mechanism connected with the second motive element 74 for causing the second redirecting element 93 to rotate, thereby causing the first linear element 62 and the wiper carrier 50 to correspondingly move.

In configurations where the drive mechanism 60 and/or the wipe mechanism 70 includes an electric motor 73/74 onboard the wiper carrier 50, such as in FIGS. 6-11, power and control signals must be provided to the electric motor(s) 73/74. One approach is to run wires for both power and control signal to the motor(s) 73/74, but another way is to run wires for power only to the motor(s) 73/74 and to send the control signal wirelessly to the motor(s) 73/74 (with each motor 73/74 having the capability to receive and interpret the wireless control signal). In another approach, at least one of a power signal and a control signal is carried to at least one of the drive mechanism 60 and the wipe mechanism 70 onboard the wiper carrier 50 via one or more electrically conductive lines 99 on the track guide 30, and/or via a first linear element 62 attached at a first end $62_{wc}$ thereof to the wiper carrier 50 and at a second end $62_{me}$ thereof to a first motive element 73 that is located offboard the wiper carrier 50. For example, a first linear element 62 may carry power and/or control signals from an offboard first electric motor 73 that is part of the drive mechanism 60, to an electric motor 74 carried onboard the wiper carrier 50 that is part of the wipe mechanism 70. The electrically conductive lines 99 may be exposed traces disposed on one or more surfaces of the track guide 30, such as the upper and lower interior surfaces 35/37 shown in FIGS. 6-7. These lines or traces 99 may be engaged by brush contacts 98 carried on the wiper carrier 50, or by metallized areas on the tractive element 68, with these brush contacts 98 or metallized areas being in electrical connection 97 with the onboard electric motor(s) 73/74.

In another embodiment, a stand-alone wiper assembly 40 may be provided, which may be used with a track guide 30. The wiper assembly 40 may include a wiper carrier 50 configured for engagement with and translation along the track guide 30, and a wiper arm 42 attached at a first end 44 thereof to a rotor 46 rotatably disposed on the wiper carrier 50. The wiper assembly 40 may be provided in multiple configurations, each of which is configured for use with one or more motive elements, such as an electric motor, for positioning the wiper carrier 50 along the track guide 30 and/or for causing the rotor to 46 rotate. Each motive element may be disposed onboard or offboard the wiper carrier 50, and the one or more motive elements for each configuration may be all onboard, all offboard, or a combination of onboard and offboard.

In one configuration (e.g., FIGS. 1 and 6-11), at least one electric motor 73/74 may be carried onboard the wiper carrier 50 and configured for positioning the wiper carrier 50 along the track guide 30, or causing the rotor 46 to rotate, or both. The at least one electric motor 73/74 may be configured to receive a power signal, a control signal, or both. The signal(s) may be provided to the at least one electric motor 73/74 via one or more electrically conductive lines 99 on the track guide 30, or via a first linear element 62 attached at a first end $62_{wc}$ thereof to the wiper carrier 50, or via both of these routes.

In another configuration (e.g., FIGS. 2-3), the wiper assembly 40 may include one or more connection points 77/78/79 on the wiper carrier 50, wherein each connection point 77/78/79 is configured for at least one of: (i) connection with a first linear element 62 driven (i.e., pushed, pulled and/or let out) by a first electric motor 73 located offboard the wiper carrier 50, for positioning the wiper carrier 50 along the track guide 30; and (ii) connection with a third linear element 71 driven by a third electric motor 75 located offboard the wiper carrier 50, for causing the rotor 46 to rotate. These connection points 77/78/79 may be any suitable point, surface or structure to which one or more linear elements 62/64/71/72 may be connected, including eyelets, swivels, weld points, etc. With regard to positioning the wiper carrier 50 along the track guide 30, FIG. 2 shows an example with two connection points 78/79 each connected with a respective linear element 62/64, and FIG. 3 shows an example with two connection points 78/79 connected to respective ends $62_L/62_R$ of a single linear element 62. Each of these linear elements 62/64 is pushed, pulled and/or let out by one or more offboard electric motors 73/74. (Note that although two linear elements 62/64 and two offboard electric motors 73/74 are shown in FIG. 2, this configuration may also include one linear element (62 or 64) and one offboard electric motor (73 or 74).) And with regard to causing the rotor 46 to rotate, FIG. 2 shows one connection point or connection surface/area 77 (i.e., around the circumference of the rotor 46) connected to the respective ends $71_{rwc}/72_{rwc}$ of two linear elements 71/72 (although these two linear elements 71/72 could also be combined into a singular linear element), while FIG. 3 does not explicitly show any connection points for rotation of the rotor 46. However, for the configuration shown in FIG. 3 in which the electric motor(s) 73/74 for positioning the wiper carrier 50 are offboard, the wiper assembly 40 may further include at least one onboard electric motor 73/74 (not shown in FIG. 3, but shown in FIGS. 6-9) which may be configured for causing the rotor 46 to rotate; thus, this particular configuration may be configured for connection with/inclusion of both onboard and offboard electric motors 73/74.

FIG. 4 is a schematic front view of a fourth embodiment of a wiper system 20, illustrating wiper rotations and translations from multiple points along the track guide 30. Here, two wiper assemblies $40_J/40_K$ are provided. (Note that subscripts "J" and "K" are used to denote left and right wiper assemblies, $40_J/40_K$, respectively.) In the two positions shown, each wiper assembly $40_J/40_K$ may sweep out a respective arcuate sector-like area $80_J/80_K$, similar to conventional wiper systems. For example, area $80_J$ has a perimeter $81_J$, left edge $84_J$, outer arcuate edge $82_J$, etc.; likewise, area $80_K$ has a perimeter $81_K$, right edge $85_K$, outer arcuate edge $82_K$, etc. However, whereas conventional wiper systems have a fixed sweep area for each of its wipers, the wiper system 20 of the present disclosure may have variable sweeps for each wiper $47_J/47_K$. Also, the wipers $47_J/47_K$ may be maintained at the 12 o'clock orientations shown, and the wiper carriers $50_J/50_K$ may be moved or translated across the windshield 10 such that a rectangular area 86 is swept out.

Figure 12:
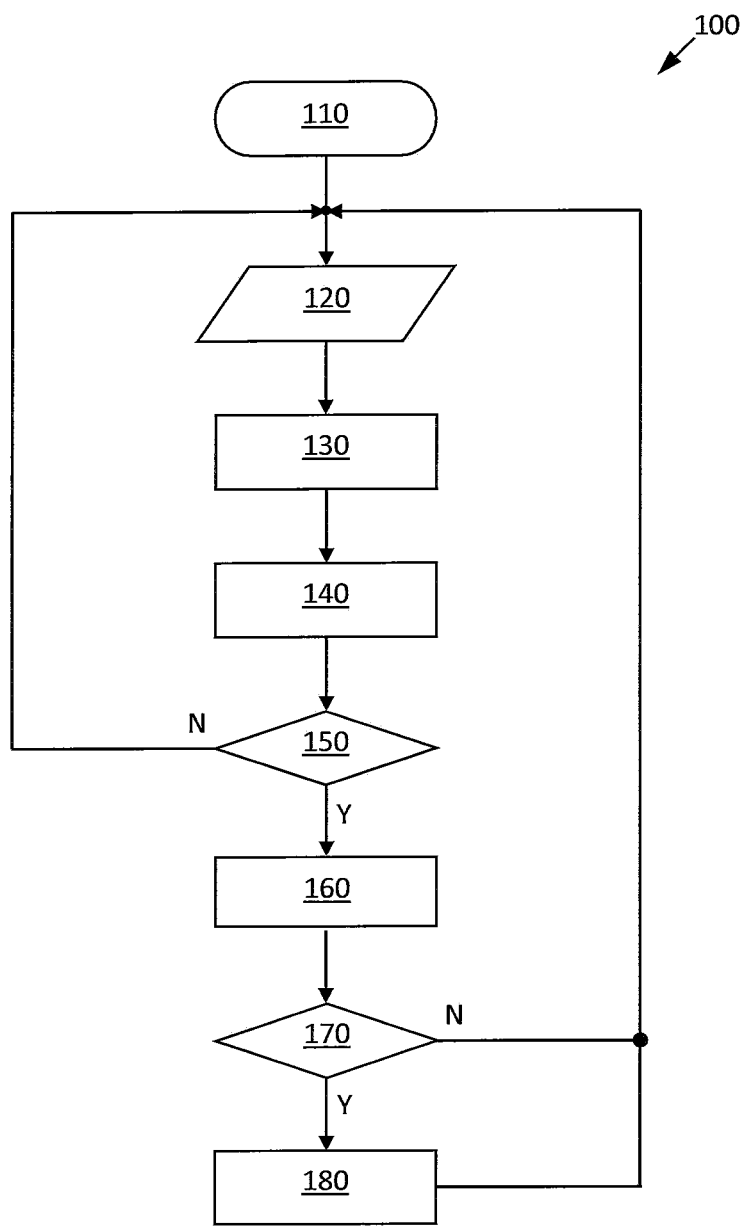
FIG. 12 is a flowchart for a method of controlling a wiper system.

Because the wiper system 20 of the present disclosure includes one or more "mobile" wiper assemblies 40 which may be positioned as desired along the track guide 30, and which can sweep out arcuate sector-like areas 80 and rectangular areas 86 as desired, this presents opportunities for innovative control schemes for such a system 20. FIG. 12 shows an exemplary method 100 for controlling a wiper system 20 having one or more wiper assemblies 40 configured for movement along a track guide 30. At block 110, the method 100 starts when the overall system that the wiper system 20 is a part of is in a "run" or "ready" mode or the like. For example, if the wiper system 20 is part of an automotive vehicle, then block 110 starts once the vehicle has power applied to the vehicle's accessory system (or other system responsible for wiper operation). At block 120, inputs are received from one or more sources, such as one or more driver controls, one or more sensors, and one or more computer elements. These sources in turn receive inputs from the driver, the vehicle (including the wiper system 20), and the outside environment (e.g., weather conditions, plus wireless signals from satellites, cell/radio towers and other vehicles), as well as information regarding the execution progress of the method 100 itself. The driver controls may include knobs, buttons, switches or controls associated with a steering column stalk, the steering wheel, the dashboard/instrument panel, and the like, which the driver may manipulate and set. The sensors may include cameras (visual, infrared, etc.), auditory sensors for receiving voice commands and information from the driver, and devices for sensing temperature (outside the vehicle), vehicle speed, etc. The computer elements may include inputs from on-vehicle computers/control units, chips, registers, storage media, wireless devices, etc. The computer elements may be configured to receive and/or store information (e.g., from the driver controls and sensors) relating to at least one of: driver actions (e.g., buttons pushed, selector knobs set), vehicle operating parameters (e.g., speed), the external environment (e.g., outside temperature and humidity, precipitation conditions, weather forecasts and warnings), the current diagnostic state of the wiper system 20 and its components, the diagnostic history of the wiper system 20 over a timeframe, and the execution status of the current wipe sequence (e.g., what was the last step performed in the sequence, and what is the next step to be performed in the sequence).

After the inputs have been received, at block 130 a wipe sequence is determined based on the received inputs. The determined wipe sequence may be selected from a group of predetermined wipe sequences. The method 100 uses inputs from the driver controls, sensors and computer elements to determine the wiper state requested by the driver (if any), the current and anticipated weather conditions, any current or anticipated vehicle maneuvers (such as back-up, parking or passing), etc., to determine or select the wipe sequence that is most appropriate for the given inputs. Each wipe sequence may include multiple attributes, such as wipe pattern (e.g., rotation, translation, parking, unparking, etc.) and wiper participation (i.e., which wipers 47 are involved), and each of these attributes may have one or more parameters. For example, a wipe pattern of rotation (see FIGS. 1-2) may have parameters for each wiper assembly 40 specifying the location along the track guide 30 where the wiper assembly 40 is to be positioned, the angles (with respect to some reference) for the left and right edges 84/85 of the wipe area 80, the rotational speed for each wipe, the amount of delay (if any) between wipes, the number of wipes to be made (e.g., a fixed number, or automatically adjusted based on certain inputs or conditions), etc. The wipe sequence attributes and parameters may also include fluid dispensing, "shaking" of wipers 47 that may have ice or slush attached to it, additional or special wipes of certain areas where slush may build up, etc. For example, if it is snowing or sleeting and a wipe sequence calls for one wiper 47 to translationally or laterally wipe the driver's side of the windshield 10, and another wiper 47 to do the same on the passenger's side, a vertical column of slush may build up in the middle of the windshield 10, so a special sequence may be executed (e.g., after every three regular wipes, or as otherwise indicated by sensor inputs) to have one of the wipers 47 position itself along the track guide 30 and rotationally wipe through this middle portion of the windshield 10. This special sequence could then be repeated with the two wipers 47 taking turns executing the special sequence as directed. Note that a wipe sequence may comprise a sequential combination of two or more other wipe sequences; for example, multiple basic sequences may be combined to form a more complex sequence.

Once the appropriate wipe sequence has been determined, at block 140 the first or next step in the determined wipe sequence is executed, and at block 150 it is detected whether any execution error has occurred in the executed step. For example, if the step was to position the wiper carrier 50 at a certain location along the track guide 30, but encoders or sensors indicate that the wiper carrier 50 is not positioned as commanded, then an error has occurred and is detected. At block 160, if an execution error is detected, then a diagnostic sequence is performed; otherwise, the method 100 returns to the receiving step at block 120. The diagnostic sequence may be associated with the wipe sequence, and may further be associated with the step in which the error was detected. The diagnostic sequence may be selected from a group of predetermined diagnostic sequences. At block 170, observation is made as to whether a diagnostic error occurred in the performed diagnostic sequence, and at block 180, if a diagnostic error is observed, then a diagnostic fail state is registered and the method 100 reverts to the receiving step at block 120; otherwise, no diagnostic fail state is registered and the method 100 reverts to the receiving step 120. The diagnostic fail state may be a flag or other indicator in a register, buffer, memory or the like, or a signal or trigger sent, which indicates a specific diagnostic failure has occurred. The diagnostic fail state may include or be accompanied by additional information, such as which wiper assembly 40 was involved, the location of the wiper carrier 50 on the track guide 30, the rotation angle(s) involved, etc.

In the method 100 illustrated in FIG. 12, as long as no execution error is detected at block 150, the system will continue a loop of checking for inputs (block 120), determining whether the current wipe sequence (or a new or modified wipe sequence) is appropriate (block 130), and executing the wipe sequence (block 140). If an execution error is detected at block 150, the diagnostic sequence at block 160 is performed. This diagnostic sequence may include steps similar to blocks 120 through 140, in that the diagnostic sequence may continuously check for inputs (like block 120), determine whether the current diagnostic sequence (or a new or modified diagnostic sequence) is appropriate (like block 130), and execute the diagnostic sequence (like block 140).

When the wiper system 20 includes two or more wiper assemblies 40, the group of predetermined wipe sequences may include a wipe sequence for alternating wipes between the two or more wiper assemblies 40, as well as a wipe sequence for use of only one of the wiper assemblies 40 in an event of failure of the other of the wiper assemblies 40. For example, if one of the wiper assemblies 40 is unable to translate along the track guide 30, another wiper assembly 40 on the same track guide 30 may be commanded to push the disabled wiper assembly 40 to a designated area (e.g., to an adjacent side of the windshield 10). Or, if one wiper assembly 40 is unable to rotate or experiences some limitation in its ability or range of rotation such that some portion of the windshield 10 cannot be wiped, then this condition may be sensed and a wipe sequence commanded which causes another wiper assembly 40 to take over some or all of the rotational (or other) wiping for the disabled wiper assembly 40. The predetermined wipe sequences may include special sequences, routines or considerations for collision avoidance as between or among the two or more wiper assemblies 40, loss of power or signal to one or more wiper assemblies 40, re-initialization/re-calibration after a power or signal loss, etc. Alternatively or additionally, wipe sequences may be determined or built on-the-fly using artificial intelligence, machine learning, fuzzy logic modules or other approaches in which appropriate sequences may be created based on given inputs and conditions. Each wiper assembly 40 may be operatively connected with its own respective lower-level controller, with a single higher-level controller operatively connected with and controlling the lower-level controllers; or, all of the wiper assemblies 40 may be operatively connected to a single centralized controller.

In addition to the embodiments, configurations and arrangements disclosed above, many other features and modifications are possible. First, each wiper assembly 40 may have one or more arms in addition to the one wiper arm 42 discussed above. Such additional arm(s) may assist with parking, wiper blade angulation, and/or other maneuvers. Each additional arm may be connected to its own dedicated motive element carried onboard or offboard the wiper carrier 50, and/or it may share a connection to a motive element with another element of the wiper assembly 40 (such as by the use of clutches, transmissions, gear arrangements, etc.). Second, while the track guide 30 is shown in the drawings as being straight, it may also be curved, such as along the peripheral contour or perimeter 15 of the windshield 10. A first portion or length of the track guide 30 may run along the windshield perimeter 15, and a second portion or length (connected with the first portion or length) may veer away from the windshield perimeter 15, such as near the center of the windshield 10 and/or at one or more corners 16/17 of the windshield 10. Such veered-away portions or lengths may assist with parking the wipers 47. Third, while one track guide 30 is shown in the drawings, which may be used with one or more wiper assemblies 40, more than one track guide 30 may be provided, such as one on the driver's side of the windshield 10 and one on the passenger's side. Fourth, the track guide 30 may be attached to a firewall, bulkhead or other structure near an edge 11/12/13/14 of the windshield 10. Fifth, for automotive applications, translating wipers 47 can be tilted forward for slower wipes, and backward for faster wipes. This is because at slower vehicle speeds, raindrops tend to run downward after impacting the windshield 10 (due to gravity), and at higher vehicle speeds raindrops tend to run upward after impacting the windshield 10 (due to wind speed). In these tilted translational wipes, the swept-out area on the windshield 10 may be generally rhombus-shape. Sixth, the location and speed of each wiper carrier 50 along the track guide 30, as well as the angular location and rotational speed of each wiper 47, may be determined by use of encoders, Hall effect sensors, etc. Seventh, each electric motor may be monitored to detect any increase in current which may indicate additional load due to binding, drag, obstruction or the like. Eighth, the wiper system 20 may be used not only on the front windshield of a vehicle, but also on the rear and side windows as well. Ninth, when a motive element or electric motor is described herein as "letting out" a linear element at one end of the linear element, this means to pay out, slacken or release the linear element when it is being pulled at its other end (e.g., by another motive element), so that the linear element may travel along in the direction it is being pulled and yet remain generally taut. Tenth, the track guide 30 may have compound curvature and/or it may twist to follow the contour of the windshield 10. In addition to these modifications, many others are possible as well.

The above description is intended to be illustrative, and not restrictive. While the dimensions and types of materials described herein are intended to be illustrative, they are by no means limiting and are exemplary embodiments. Many other embodiments will be apparent to those of skill in the art upon reviewing the above description. Moreover, in the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of X and Y" should be understood to mean "only X, only Y, or both X and Y." Furthermore, references to a particular embodiment or example are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, such as in the phrase "substantially circular" or "generally circular", these adverbs mean "for the most part", "to a significant extent" and/or "to a large degree", and do not necessarily mean "perfectly", "completely", "strictly" or "entirely".

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A wiper system, comprising:
   a track guide;
   a wiper assembly having a wiper arm attached at a first end thereof to a rotor rotatably disposed on a wiper carrier, the wiper carrier engaged with the track guide and configured for translation therealong;
   a drive mechanism connected with the wiper carrier and configured for positioning the wiper carrier along the track guide; and
   a wipe mechanism connected with at least one of the rotor and the wiper carrier and configured to cause the rotor to rotate;
   wherein the drive mechanism comprises a first electric motor located offboard the wiper carrier and a first linear element attached at one end thereof to the wiper carrier and at another end thereof to the first electric motor;
   wherein the drive mechanism further includes a first motive element located offboard the wiper carrier and a second linear element attached at one end thereof to the wiper carrier and at another end thereof to the first motive element, wherein the first electric motor, the first motive element and the first and second linear elements are cooperatively configured for positioning the wiper carrier along the track guide;
   wherein the wipe mechanism comprises a second electric motor located offboard the wiper carrier and a third linear element attached at one end thereof to at least one of the rotor and the wiper carrier and at another end thereof to the second electric motor; and
   wherein the wipe mechanism further includes a second motive element located offboard the wiper carrier and a fourth linear element attached at one end thereof to the at least one of the rotor and the wiper carrier and at another end thereof to the second motive element, wherein the second electric motor, the second motive element and the third and fourth linear elements are cooperatively configured for causing the rotor to rotate.

2. A method of controlling a wiper system, the wiper system having a track guide, a wiper assembly having a wiper arm attached at a first end thereof to a rotor rotatably disposed on a wiper carrier that is engaged with the track guide and configured for translation along the track guide, a drive mechanism connected with the wiper carrier and configured for positioning the wiper carrier along the track guide, and a wipe mechanism connected with at least one of the rotor and the wiper carrier and configured to cause the rotor to rotate, wherein (i) the drive mechanism comprises a first electric motor located offboard the wiper carrier and a first linear element attached at one end thereof to the wiper carrier and at another end thereof to the first electric motor, and the drive mechanism further includes a first motive element located offboard the wiper carrier and a second linear element attached at one end thereof to the wiper carrier and at another end thereof to the first motive element, wherein the first electric motor, the first motive element and the first and seond linear elements are cooperatively configured for positioning the wiper carrier along the track guide, and (ii) the wipe mechanism comprises a second electric motor located offboard the wiper carrier and a third linear element attached at one end thereof to at least one of the rotor and the wiper carrier and at another end thereof to the second electric motor, and the wipe mechanism further includes a second motive element located offboard the wiper carrier and a fourth linear element attached at one end thereof to the at least one of the rotor and the wiper carrier and at another end thereof to the second motive element, wherein the second electric motor, the second motive element and the third and fourth linear elements are cooperatively configured for causing the rotor to rotate, the method comprising:
   receiving inputs from at least one of a driver control, a sensor and a computer element;
   determining a wipe sequence based on the received inputs;
   executing a next step in the determined wipe sequence;
   detecting whether an execution error occurred in the executed next step;
   if an execution error is detected, then performing a diagnostic sequence, else returning to the receiving step;
   observing whether a diagnostic error occurred in the performed diagnostic sequence; and
   if a diagnostic error is observed, then registering a diagnostic fail state and reverting to the receiving step, else reverting to the receiving step.

3. A method according to claim 2, wherein the computer element is configured to store information relating to at least one of a driver action, a vehicle operating parameter, an external environment, a diagnostic state of the wiper system, a diagnostic history of the wiper system and an execution status of the determined wipe sequence.

4. A method according to claim 2, wherein the diagnostic sequence is associated with the wipe sequence.

5. A method according to claim 2, wherein the determining step includes selecting the wipe sequence from a group of predetermined wipe sequences.

6. A method according to claim 5, wherein the wiper system includes at least two wiper assemblies, and the group of predetermined wipe sequences includes at least one of:
- a wipe sequence for alternating wipes between the two wiper assemblies; and
- a wipe sequence for use of only one of the wiper assemblies in an event of failure of the other of the wiper assemblies.

* * * * *